P. P. E. M. KOCH.
Apparatus for Preserving Food.
No. 208,743.   Patented Oct. 8, 1878.
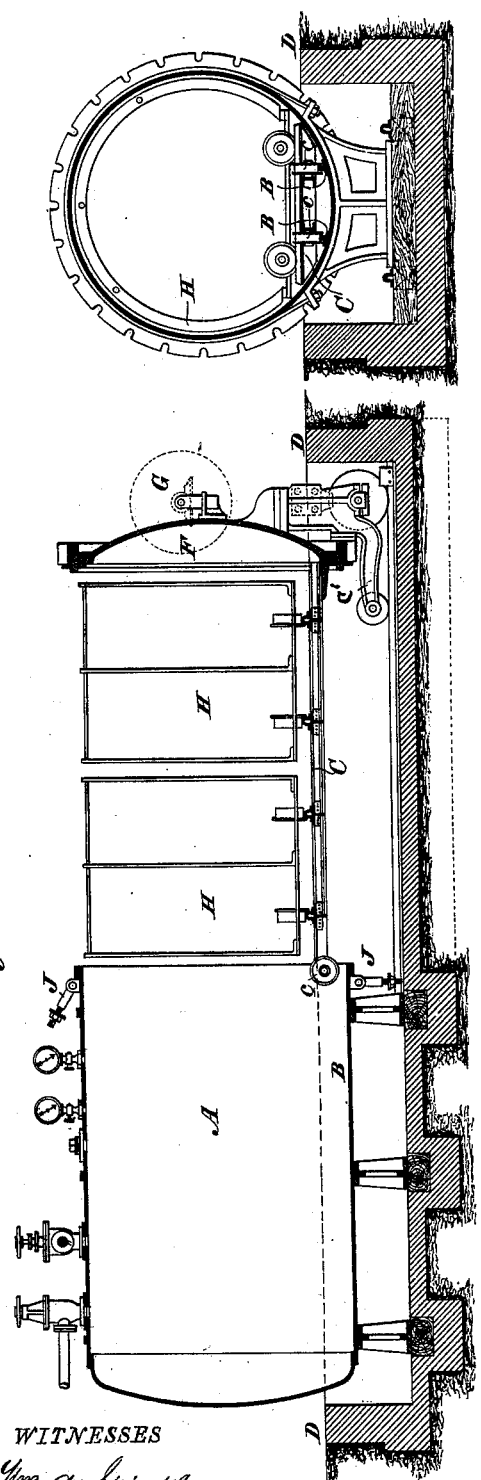
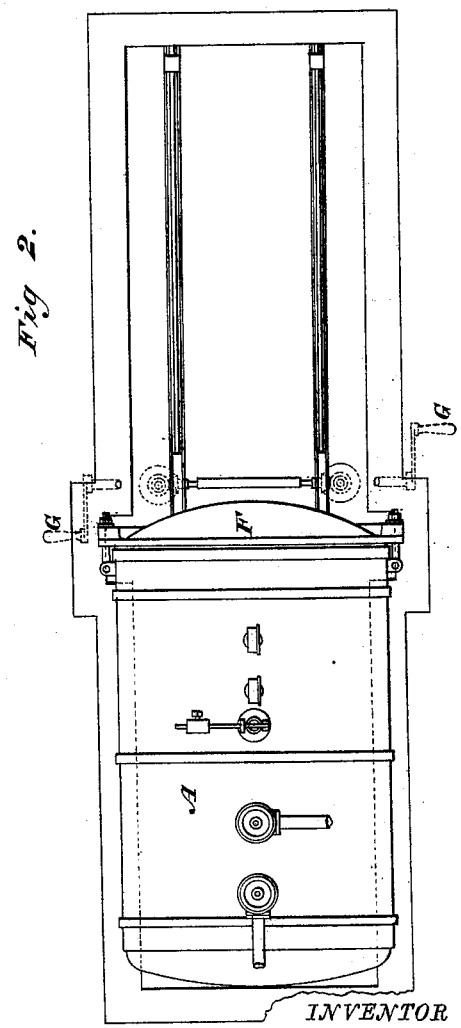

UNITED STATES PATENT OFFICE.

PIERRE P. E. M. KOCH, OF ANTWERP, BELGIUM.

IMPROVEMENT IN APPARATUS FOR PRESERVING FOOD.

Specification forming part of Letters Patent No. 208,743, dated October 8, 1878; application filed July 23, 1878; patented in Canada, August 9, 1877; patented in England, No. 2,801 of 1877.

*To all whom it may concern:*

Be it known that I, PIERRE PAUL EGIDE MARIE KOCH, of 86 Boulevard Leopold, Antwerp, in the Kingdom of Belgium, have invented new and useful Improvements in Apparatus for the Preservation of Food and of substances liable to fermentation or decay, which improvements are fully set forth in the following specification, reference being had to the accompanying drawings.

The object of my invention is mainly to provide apparatus suitable for use in the preservation of all sorts of alimentary substances in their different states, whether natural or salted, smoked, boiled, or cooked.

The invention is applicable to all substances which are subject to change, fermentation, or corruption—meat, fowl, game, fish, fruit, flowers, roots, vegetables, fats, butter, bread, skins, yeast, anatomical preparations, and so forth.

Several preliminary treatments or processes are hereinafter described for the purpose of showing the adaptability of my apparatus to the treatment of different substances.

To preserve articles of food and substances liable to fermentation in general in their natural condition, I place them in a solution of bisulphite of soda, of potash, or of lime employed either alone or associated with the acetate or the borate of soda, or with salycilic acid.

The degree of concentration of this bath and the duration of the immersion will vary essentially with the nature and the destination of the substance to be preserved, with the seasons, the country, the temperature, the length of the period of preservation which is proposed, the special risks of decomposition to be encountered after preservation, and so forth. The substances to be preserved are then submitted to the pressure of a gas in a close vessel of suitable form.

The subject-matter claimed will hereinafter be specifically designated.

The apparatus shown in Figures 1, 2, and 3 is composed of a horizontal cylinder, A. It is constructed of metal and is furnished at the lower part with rails B B. Upon these rails there is supported an open iron frame or platform, C, furnished with wheels c c. This frame or platform is on the ground-level D. To the front, and perpendicular to it, the cover F of the cylinder is fixed and supported on the truck c'. A winch, G, combined with these parts, furnishes the means of running them in and out at pleasure.

The matters to be preserved are, according to their nature and dimensions, suspended or arranged horizontally (separating them with surfaces formed with rushes, rattan, or other material) in wagons approximately of a cylindrical form, so that they may be able to enter conveniently the apparatus A.

The loaded wagons H H are run onto the platform C when it has been withdrawn from the boiler, and they occupy the space between the mouth of the boiler and the cover F; then, by means of the winch G, they are carried on into the cylinder A, and at the same time the cover F comes into place to close the apparatus air-tight, and it is fixed in its place by means of the bolts J J. This boiler, after the air has first been exhausted from it, is put into communication with another, in which deoxygenated air has been compressed. This may be obtained by the action of copper or iron turnings heated to redness, or by means of coke or wood charcoal similarly heated, or by other means.

The amount and duration of this pressure, which may also be obtained directly by means of a force-pump, will vary with the nature of the substance to be preserved, its consistence and size, the special conditions of climate, seasons, temperature, and the end desired to be attained.

After this operation the wagons are taken out of the cylinder, and the substances are inclosed in vessels or receivers of glass, earthenware, tin-plate, or other material; or it may be in wooden packages, (barrels or vessels,) in which, according to circumstances, I form a vacuum. I replace the atmospheric air by deoxygenated air, or I interpose a substance, such as fat, tallow, margarine, and the like.

I obtained a Canadian patent for my invention in August 9, 1877, No. 7,731, to run for five years.

I have also obtained an English patent for my invention, No. 2,801 of 1877.

I claim—

1. The combination, substantially as hereinbefore described, of the open-ended cylinder or receiver provided with guideways or rails, the frame or platform supported upon and traversing said rails, and the cylinder-cover carried by said frame and supported on a truck, as described.

2. The combination, substantially as hereinbefore set forth, of the cylinder or receiver, the frame or platform provided with the transverse wagon-tracks and traversing the cylinder, and the wagons supported by the frame, as described.

PIERRE PAUL EGIDE MARIE KOCH. [L. S.]

Witnesses:
    ANT. HAIL VON NHEZ,
    ED. CARPENTIERS.